United States Patent
Ramrus et al.

(10) Patent No.: US 9,196,912 B2
(45) Date of Patent: Nov. 24, 2015

(54) EPOXY METHACRYLATE BASED ADHESIVE FOR FUEL CELL FLOW FIELD PLATES

(71) Applicants: Daimler AG, Stuttgart (DE); Ford Motor Company, Dearborn, MI (US)

(72) Inventors: Daniel Ramrus, Vancouver (CA); Marek Gnatowski, Coquitlam (CA); Mathew Leung, Burnaby (CA); Grace Sun, Richmond (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 92 days.

(21) Appl. No.: 14/243,011

(22) Filed: Apr. 2, 2014

(65) Prior Publication Data

US 2014/0302417 A1     Oct. 9, 2014

Related U.S. Application Data

(60) Provisional application No. 61/808,580, filed on Apr. 4, 2013.

(51) Int. Cl.
| | |
|---|---|
| *H01M 8/02* | (2006.01) |
| *C09J 9/02* | (2006.01) |
| *H01M 8/10* | (2006.01) |

(52) U.S. Cl.
CPC .............. *H01M 8/0286* (2013.01); *C09J 9/02* (2013.01); *H01M 8/0202* (2013.01); *H01M 8/0221* (2013.01); *H01M 8/0228* (2013.01); *H01M 2008/1095* (2013.01); *Y02E 60/50* (2013.01)

(58) Field of Classification Search
CPC ............... H01M 2008/1095; H01M 8/0202; H01M 8/0221; H01M 8/0228; H01M 8/0286; H01M 8/028; H01M 8/0284; C09J 9/02; Y02E 60/50
See application file for complete search history.

(56) References Cited

U.S. PATENT DOCUMENTS

| | | | |
|---|---|---|---|
| 6,933,333 B2 | 8/2005 | Clulow et al. | |
| 7,858,696 B2 * | 12/2010 | Yasumura et al. | 524/556 |
| 2005/0031933 A1 | 2/2005 | Blunk et al. | |
| 2008/0107952 A1 | 5/2008 | Farrington | |

* cited by examiner

*Primary Examiner* — Carlos Barcena
(74) *Attorney, Agent, or Firm* — Patent Central LLC; Stephan A. Pendorf

(57) ABSTRACT

An electrically conductive adhesive is disclosed for bonding anode and cathode flow field plates together for use in fuel cells. The adhesive formulation comprises epoxy methacrylate resin and non-fibrous carbon particles but little to no carbon fibres. The adhesive provides suitable strength, bond gap, conductivity and other properties, particularly for flow field plates made of flexible graphite, carbon, or metal.

24 Claims, No Drawings

EPOXY METHACRYLATE BASED ADHESIVE FOR FUEL CELL FLOW FIELD PLATES

BACKGROUND

1. Field of the Invention

This invention relates to adhesives used for bonding flow field plates together for use in fuel cells. In particular, it relates to epoxy methacrylate based adhesives for preparing bipolar plate assemblies for solid polymer electrolyte fuel cells.

2. Description of the Related Art

Fuel cells such as proton exchange membrane or solid polymer electrolyte fuel cells (SPEFCs) electrochemically convert fuel (such as hydrogen) and oxidant (such as oxygen or air) to generate electric power. SPEFCs generally employ a proton conducting polymer membrane electrolyte between two electrodes, namely a cathode and an anode. A structure comprising a proton conducting polymer membrane sandwiched between two electrodes is known as a membrane electrode assembly (MEA). In a typical fuel cell, flow field plates comprising numerous fluid distribution channels for the reactants are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is of order of 1V, a plurality of cells is usually stacked together in series for commercial applications. Fuel cell stacks can be further connected in arrays of interconnected stacks in series and/or parallel for use in automotive applications and the like.

Along with water, heat is a significant by-product from the electrochemical reactions taking place within the fuel cell. Means for cooling a fuel cell stack is thus generally required. Stacks designed to achieve high power density (e.g. automotive stacks) typically circulate liquid coolant throughout the stack in order to remove heat quickly and efficiently. To accomplish this, coolant flow fields comprising numerous coolant channels are also typically incorporated in the flow field plates of the cells in the stacks. The coolant flow fields may be formed on the electrochemically inactive surfaces of the flow field plates and thus can distribute coolant evenly throughout the cells while keeping the coolant reliably separated from the reactants.

Bipolar plate assemblies comprising an anode flow field plate and a cathode flow field plate which have been bonded and appropriately sealed together so as to form a sealed coolant flow field between the plates are thus commonly employed in the art. Various transition channels, ports, ducts, and other features involving all three operating fluids (i.e. fuel, oxidant, and coolant) may also appear on the inactive side of these plates. The operating fluids may be provided under significant pressure and thus all the features in the plates have to be sealed appropriately to prevent leaks between the fluids and to the external environment. A further requirement for bipolar plate assemblies is that there is a satisfactory electrical connection between the two plates. This is because the substantial current generated by the fuel cell stack must pass between the two plates. Numerous variants of such bipolar plate assemblies appear in the art, for instance as disclosed in US20080107952.

The plates making up the assembly may optionally be metallic, in which case they are typically welded together so as to appropriately seal all the fluid passages from each other and from the external environment. Additional welds may be provided to enhance the ability of the assembly to carry electrical current, particularly opposite the active areas of the plates. Metallic plates may however be bonded and sealed together using adhesives. US20050031933 for instance discloses an elastomeric adhesive (with glass transition temperature below −20° C.) primarily for bonding metallic plates together. A conductive primer layer is required.

The plates making up the assembly may also optionally be carbonaceous (e.g. formed graphite plates) and such plates are frequently sealed together using elastomeric contact seals with the entire stack being held under a compression load applied by some suitable mechanical means. More recently, bipolar plate assemblies are being prepared using adhesives that are capable of withstanding the challenging fuel cell environment. Various resin adhesives have been contemplated for this purpose. Such adhesives are applied by screen printing or are otherwise dispensed in a pattern suitable for isolating each desired fluid cavity. Typically such adhesives must undergo a heat curing step.

Finding suitable adhesives that meet all the requirements for this application can be challenging however. Aside from having sufficient bond strength for mechanical purposes, a low electrical resistance is required as substantial current must flow efficiently through the bonded flow field plates. Further, a suitable adhesive generally should have a high glass transition temperature, Tg, such that it does not behave as an elastomer and thus maintains desirable characteristics over a range of fuel cell operating temperatures. A less obvious requirement perhaps is the need to achieve reproducible, uniform bond gaps since the dimensions and hence tolerances of component thicknesses in a fuel cell stack are typically very small. Further still, for manufacturing purposes, certain viscosity characteristics (e.g. viscosity versus shear as a function of temperature and time) are needed for preferred methods for application (e.g. roller coating) and also for subsequent curing. For instance, the material properties of the adhesive can radically change between the time of application and the time of curing with undesirable consequences (e.g. the viscosity may significantly reduce as the adhesive is heated and can run out of the joint or spread via capillary action across the parts and onto fixtures used to locate and press the plates during curing).

In U.S. Pat. No. 6,933,333, an adhesive formulation is disclosed for purposes of bonding bipolar plate assemblies together for use in solid polymer electrolyte fuel cells. The formulations are based on either vinyl ester or polyester resins. Milled carbon fibres are employed in these formulations in amounts of from about 2 to 20% by weight and provide structural integrity in the cured composite interface. The formulations also include other non-fibrous graphite powder.

Despite the advances made to date, there remains a need for adhesives having better properties for use in bonding bipolar plate assemblies together for fuel cells. This invention fulfills these needs and provides further related advantages.

SUMMARY

An improved electrically conductive adhesive has been developed for bonding an anode flow field plate and a cathode flow field plate together to form a bipolar plate assembly for a fuel cell. Sufficient bond strength, bond gap, and other desired properties can be obtained using an adhesive formulated with epoxy methacrylate resin and minimal added carbon fibres.

Specifically, the adhesive comprises epoxy methacrylate resin in an amount ranging from about 3 to 70% by weight, styrene in an amount ranging from about 0 to 20% by weight, isobornylacrylate in an amount ranging from about 0 to 20% by weight and preferably from about 1 to 15% by weight, non-fibrous carbon particles in an amount ranging from about 11 to 30% by weight, a non-conductive rheology modifier, a radical initiator, a stabilizer, and minimal carbon fibres (i.e. in an amount ranging from 0 to less than 2% by weight). In particular, the adhesive can be essentially free of carbon fibres.

In an exemplary embodiment, the amounts of the epoxy methacrylate resin, styrene, and isobornylacrylate are about 50%, 10% and 10% respectively. Additionally, the adhesive can comprise trimethylolpropane trimethacrylate in an amount about 5% by weight.

Suitable non-fibrous carbon particles are synthetic graphite. In exemplary embodiments, an amount about 22% by weight of synthetic or natural graphite is used in the adhesive formulation. The particle size of the carbon particles can be important with regards to obtaining desired bond properties. An average particle size in the range from about 5 to 15 micrometers can be suitable.

The viscosity characteristics of the adhesive formulation can be desirably modified by incorporating a rheology modifier in an amount from about 0.01 to 2% by weight. In an exemplary embodiment, the rheology modifier is amorphous silica present in an amount about 0.8% by weight.

A radical initiator is included to initiate polymerization. The initiator can be in an amount from 0.5 to 6% by weight. In an exemplary embodiment, the initiator is dibenzoyl peroxide in an amount about 2.3% by weight. A stabilizer is also included to stabilize the formulation for working purposes. The stabilizer can be, for instance tert-butylhydroquinone in an amount up to about 1% by weight.

The improved adhesives can have a glass transition temperature, Tg, that is desirably greater than about 100° C.

Adhesives of the invention are suitable for bonding together an anode and cathode flow field plate to form a bipolar plate assembly for a fuel cell, e.g. a solid polymer electrolyte fuel cell. In particular, they are suitable for bonding together plates in which one or both plates are made of flexible graphite, carbon, or metal. Specifically, a desirable tensile strength for the bond can be obtained that is greater than about 40 MPa stress at break for a 0.5 square inch sample.

In the bipolar plate assemblies, the anode flow field plate comprises an anode flow field on one side, a coolant flow field on the other side, and a sealing surface on the coolant flow field side. In a like manner, the cathode flow field plate comprises a cathode flow field on one side, a coolant flow field on the other side, and a sealing surface on the coolant flow field side. Bonding of the plates can be accomplished by providing the anode flow field plate and the cathode flow field plate, applying an amount of the adhesive to at least one of the flow field plates such that adhesive covers the sealing surfaces between the plates, mating the coolant flow field sides of the anode and cathode flow field plates together in alignment, and curing the adhesive, thereby bonding the anode and cathode flow field plates to make the bipolar plate assembly. Curing can be accomplished by thermal, moisture, or UV methods. Thermal curing for instance comprises pressing the mated plates together at an appropriate pressure (e.g. greater than 0.3 MPa) and a temperature (e.g. from about 100 to 200° C.) for a period of time (from about 5 seconds to 1 hour).

After the bonding, a desirable adhesive filled gap in the range from about 3 to 20 micrometers thick can remain between the sealing surfaces of the plates. In certain preferred embodiments, the adhesive filled gap is in the range from about 4 to 7 micrometers thick. Primer is not a requirement, and thus the sealing surfaces of the anode and cathode flow field plates can be essentially free of primer.

In the plate bonding method, the adhesive can be applied in a liquid carrier (e.g. organic solvent) which is then dried before mating the plates together. Roller coating in particular may be used to apply the adhesive. Roller coating can be preferred over other alternatives such as screen printing for cost reasons. The rheology of the adhesive formulation can be modified for this purpose by appropriately varying the amounts and/or types of additives (e.g. amount of amorphous silica in an exemplary embodiment).

These and other aspects of the invention are evident upon reference to the following detailed description.

DETAILED DESCRIPTION

Herein, the following definitions have been used. In a quantitative context, the term "about" should be construed as being in the range up to plus 10% and down to minus 10%.

The term epoxy methacrylate resin is intended to include both bisphenol and novolac epoxy methacrylate resins.

Also herein, a distinction is made between non-fibrous and fibrous types of carbon particles. The former can include particles shaped as plates, flakes, or even needles in which the aspect ratio of the needles is less than about 10. On the other hand, the latter fibrous type of carbon particles, i.e. carbon fibres, include particles with fibrous or filamentary structure but with large aspect ratios greater than about 10.

Formulations for an electrically conductive adhesive are provided for bonding anode and cathode flow field plates together for use in fuel cells. The formulations are based on epoxy methacrylate resin and non-fibrous carbon particles. Even with little to no carbon fibres, it has been found that such adhesives can provide suitable strength as well as bond gap, conductivity and other properties for this application. The adhesives can be employed for bonding flow field plates made with various materials (e.g. carbon, metal) but are particularly suitable solid polymer fuel cell flow field plates made of flexible graphite.

The amount of base epoxy methacrylate resin in the formulation is between about 3 and 70% by weight. The amount of non-fibrous carbon particles is between about 11 and 30% by weight. Various sources may be considered for the non-fibrous carbon particles. Synthetic graphite has been demonstrated to be a particularly suitable choice. The particle size of the carbon particles is important with regards to obtaining a desired bond gap between the bonded plates (e.g. between about 2 to 20 micrometers, and in some embodiments, preferably 4 to 7 micrometers). For instance, non-fibrous carbon particles whose average particle size is in the range from about 5 to 15 micrometers can be preferred.

Other components may be employed as diluents for the base epoxy methacrylate resin. For instance, styrene may be added to lower viscosity and to facilitate easier handling for subsequent adhesive preparation. The amount of styrene may be between about 0 to 20% by weight.

In order to desirably adjust rheological properties, isobornylacrylate in an amount about 0 to 20% by weight, and preferably 1 to 15% by weight, may also be incorporated as a diluent. And further, an amount of the crosslinking promoter trimethylolpropane trimethacrylate may be incorporated as a diluent.

Other fillers may be considered in the adhesive formulations in addition to the non-fibrous carbon particles. Again for purposes of modifying rheology, various non-conductive rheology modifiers (e.g. talc, $TiO_2$, silica) may be included. For instance, amorphous silica in an amount from about 0.01 to 2% by weight may be considered.

Further still, other components can also be included in the formulation for various practical reasons. For instance, radical initiators may be included to promote curing when ready, while stabilizers may be included to stabilize the formulation while working with it. An exemplary radical initiator is dibenzoyl peroxide in an amount from about 0.5 to 6% by weight. An exemplary stabilizer is tert-butylhydroquinone in amounts about hundreds of parts per million.

A representative recipe for a preferred formulation, based on the Examples below, appears in Table 4.

Formulations using such recipes can be prepared in a variety of ways. A convenient way however comprises initially mixing and diluting warmed epoxy methacrylate resin with any desired styrene and other selected diluents in order to facilitate handling. Thereafter, the desired fillers can be added and mixed in. And finally, any desired radical initiators, stabilizers, or the like can be mixed in to prepare the final adhesive formulations.

The adhesive formulations can then be used to bond flow field plates together in a conventional manner (e.g. applying an amount to the intended sealing surfaces on at least one plate, mating the plates together, and curing the adhesive. Possible curing methods include moisture, UV initiated, and thermal curing. For instance, thermal curing comprises pressing the assembly together at a sufficient pressure and temperature for a sufficient period of time in order for adequate curing to take place). Formulations with appropriate rheology characteristics offer the advantage that they can be readily applied to flow field plates using roller coating methods. Such methods can be preferred for large scale manufacture.

The following examples are illustrative of the invention but should not be construed as limiting in any way.

EXAMPLES

A series of adhesive formulations was prepared and evaluated as described below. The two resin types used were epoxy methacrylate and, for comparative purposes, epoxy diacrylate (both from Rahn). As diluents in the formulations, varied amounts of styrene, isobornyl acrylate, and trimethylolpropane trimethacrylate (crosslinking promoter) were employed (from Sigma Aldrich, Radcure Corporation, and Sartomer respectively). Two types of non-fibrous carbon particle fillers were used in varied amounts, namely synthetic graphite 4014 and natural graphite 3204 (both from Asbury Carbons and having nominal particle size of from 7 to 11 micron and 10 to 15 micron respectively). In one sample, calcium carbonate 4HX (from Imasco Minerals Inc.) was used as a filler. And Cab-o-sil Grade M5 amorphous silica (from Cabot Corporation) served as a filler and a non-conductive rheology modifier. Tenax dibenzoyl peroxide paste was used as a radical initiator (the paste being approximately 50% dibenzoyl peroxide by weight). And finally as a stabilizer, 97% tert-butylhydroquinone was used.

Formulations were prepared by first mixing and diluting warmed resin with styrene and any other diluents to facilitate handling and to prepare a "binder". At this stage, representative samples were prepared by curing the binders in a mold at 120° C. for 15 minutes under 400 psi pressure to produce dumbbell shaped specimens for glass transition temperature determination and tensile testing. Fillers were then added and mixed in with the binder. And finally, peroxide radical initiator and any stabilizer were mixed in to prepare the final adhesive formulations. Representative tests were then performed on these adhesive formulations, including lap shear, electrical resistance, and viscosity testing.

The glass transition temperature measurements on the prepared binder samples were conducted using a Netzsch Dynamic Mechanical Analyser. A single cantilever setup was used with nominal specimen geometry of 3.3 mm by 1.08 mm by 5 mm. The temperature ramp up was 25° C. to 220° C. at a rate of 2° C./min and the frequency used was 10 Hz.

Tensile testing on the prepared binder samples were done according to modified ASTM Standard D638 using dumbbell shaped samples prepared in a die with dimensions described in ASTM 4894.

Lap shear testing was done on test bipolar plate samples comprising two graphite plates that had been bonded together using an approximately a 25 to 75 micron thick layer of adhesive applied between plate surfaces that had been abraded beforehand. Test samples were cured in a press at 120° C. and 60 psi for 15 min, followed by post curing in an oven at 160° C. for 1 hour. The lap shear testing was conducted using an Instron 4400 Universal Testing machine, a 500 kg load cell and a 1 mm/min crosshead speed in which the initial grip separation distance was 30 mm.

Electrical resistance measurements were made on test pieces cut out from bipolar plate samples similar to the above. Resistance was determined by passing 1 A through the adhesive joint and measuring voltage drop with the test pieces compressed together under 400 psi load.

Viscosity measurements were conducted using a Brookfield viscometer with a #7RV spindle. The viscometer with testing container was calibrated according to ASTM D2196 using 5000 cP and 30000 cP standard calibration fluids. Samples were transferred into small vials and placed in a 25° C. water bath for 10 minutes prior to the viscosity measurement and measurements were then taken at rotor speeds of 2, 4, 10 and 20 rpm.

[In earlier experiments involving other carbon fillers and not detailed herein, it was noted that use of carbon black as a filler seemed to significantly inhibit curing. Use of milled carbon fibre on the other hand seemed to accelerate curing such that there was no adequate handling time. In other earlier experiments, dispersing and anti-settling agents were evaluated but did not appear to aid in the preparation of formulations. Amorphous silica, however, had been found to be an effective rheology modifier and hence was used in the following. Finally, it was earlier noted that addition of peroxide radical initiator to the binder could cause gelation within a few weeks. The addition of small amounts of the stabilizer tert-butylhydroquinone (diluted in a small amount of styrene) resulted in significant improvement in stability.]

Table 1 below summarizes the types and amounts of components used in the various adhesive formulations tested. The amounts of diluents are expressed in parts per hundred of starting resin. The amounts of fillers, radical initiator, and stabilizer however are expressed with respect to parts of binder. That is either parts per hundred binder (i.e. parts per hundred of resin plus diluents) or parts per million binder. In all cases, 6 parts per hundred binder (phb) of Tenax peroxide paste was added as the curing agent. [For comparative purposes, in one sample both calcium carbonate and amorphous silica were used as filler without using any conductive non-fibrous carbon filler to see the effect on electrical resistance.]

TABLE 1

Adhesive formulations

| Sample # | Resin type | Diluent type and proportion (phr[1]) | | | Fillers (phb[2]) | | | | Tenax (phb[2]) | Stabilizer (ppmb[3]) |
| | | Styrene | Isobornyl Acrylate | TMPTMA[4] | Asbury 4014 synthetic graphite | Asbury 3204 natural graphite | Calcium carbonate | Amorphous silica | | |
|---|---|---|---|---|---|---|---|---|---|---|
| 1 | Epoxy | 20 | | | | | | | | |
| 2 | methacrylate | 30 | | | | | | | | |
| 3 | | 40 | | | | | | | | |
| 4 | | 60 | | | | | | | | |
| 5 | | 80 | | | | | | | | |
| 6 | | 100 | | | | | | | | |
| 7 | Epoxy | 30 | | | | | | | | |
| 8 | diacrylate | 60 | | | | | | | | |
| 9 | | 100 | | | | | | | | |
| 10 | Epoxy | 150 | | | | | | | | |
| 11 | methacrylate | 60 | | | 40 | | | | | |
| 12 | | 150 | | | 40 | | | | | |
| 13 | | 100 | | | 5 | | | | | |
| 14 | | 100 | | | 10 | | | | | |
| 15 | | 100 | | | 20 | | | | | |
| 16 | | 100 | | | 40 | | | | | |
| 17 | | 100 | | | | | 20 | 5 | | |
| 18 | | 100 | | | 25 | | | 2.5 | | |
| 19 | | 100 | | | 25 | | | | | |
| 20 | | 100 | | | 10 | | | | | |
| 21 | | 100 | | | 20 | | | | | |
| 22 | | 100 | | | 40 | | | | | |
| 23 | | 100 | | | 25 | | | 2.6 | | |
| 24 | | 100 | | | 35 | | | 1 | | |
| 25 | | 60 | | | 20 | | | 1.5 | | 100 |
| 26 | | | 60 | 10 | | | | | | 100 |
| 27 | | | 60 | 10 | 20 | | | 1.3 | | 100 |
| 28 | | 30 | 30 | 10 | 20 | | | 1 | | 100 |
| 29 | | 50 | | | 25 | | | 1.1 | | 100 |
| 30 | | 40 | | | 25 | | | 0.9 | | 100 |
| 31 | | 25 | 15 | | 25 | | | 1 | | 100 |
| 32 | | 30 | | | 25 | | | 1 | | 250 |
| 33 | | 20 | 20 | | 30 | | | 1 | | 250 |
| 34 | | 15 | 15 | | 25 | | | 1 | | 250 |
| 35 | | 20 | 20 | | 15 | 15 | | 1 | | 250 |
| 36 | | 20 | 20 | 10 | 25 | | | 1 | | 250 |

[1] phr = parts per hundred with respect to the indicated resin
[2] phb = parts per hundred with respect to the indicated binder (i.e. resin + diluents)
[3] ppmb = parts per million with respect to the indicated binder (i.e. resin + diluents)
[4] TMPTMA = trimethylolpropane trimethacrylate Table 2 below summarizes the results of the glass transition temperature and tensile strength measurements performed on certain binders used in the adhesive formulations.

TABLE 2

Characteristics of certain binders

| Sample # from which binder obtained | Tg1 | Tensile strength stress at break (MPa) |
|---|---|---|
| 1 | 166 | 69 |
| 2 | 161 | 68 |
| 3 | 158 | 69 |
| 4 | 153 | 51 |
| 6 | 140 | 58 |
| 7 | 111 | 64 |
| 8 | NA | 54 |
| 9 | NA | 47 |
| 27 | 175 | 45 |

Tables 3, 4 and 5 below respectively summarize the results of the lap shear, resistance and viscosity measurements performed on certain adhesive formulations.

TABLE 3

Lap shear characteristics of certain adhesive formulations

| Sample # | Lap shear stress at break (MPa) |
|---|---|
| 12 | 7 |
| 13 | 9 |
| 14 | 10 |
| 15 | 9 |
| 16 | 10 |
| 26 | 10 |
| 33 | 14 |

TABLE 4

Resistance characteristics of certain adhesive formulations

| Sample # | Normalized average resistance for 1 cm$^2$ sample at 400 psi load (milliohms) |
|---|---|
| 13 | 23 |
| 17 | 1670 |

TABLE 4-continued

Resistance characteristics of certain adhesive formulations

| Sample # | Normalized average resistance for 1 cm² sample at 400 psi load (milliohms) |
|---|---|
| 18 | 21 |
| 20 | 21 |
| 21 | 20 |
| 22 | 19 |
| 36 | 28 |

TABLE 5

Viscosity characteristics of certain adhesive formulations

| Sample # | Viscosity (cP) at shear rate 0.42 s$^{-1}$ | Viscosity (cP) at shear rate 0.84 s$^{-1}$ | Viscosity (cP) at shear rate 2.09 s$^{-1}$ | Viscosity (cP) at shear rate 4.18 s$^{-1}$ |
|---|---|---|---|---|
| 22 | 28,100 | 20,100 | 11,800 | 8,000 |
| 23 | 19,300 | 14,100 | 9,500 | 7,200 |
| 24 | 35,100 | 21,000 | 13,000 | 8,800 |
| 33 | | | 10,600 | 9,200 |
| 36 | 26,300 | 16,100 | 9,500 | 7,600 |

In further testing, the adhesive filled gap between the plates was measured in sample #36. Gap values were determined by sectioning the sample and viewing under a scanning electron microscope. The gap was determined in five different locations and values of 5.2, 4.8, 4.9, 4.3 and 4.4 micrometers were obtained (average of 4.7 micrometers).

Several bipolar plate samples made using adhesive sample #36 were then subjected to a durability test involving immersion for 6000 hours in a boiling mixture of water and ethylene glycol (50%/50% by volume). The lap shear strength of samples was determined both before and after this prolonged immersion. The lap shear stress at break was virtually unchanged from the values obtained prior to such exposure. (In this durability testing, a slightly modified version of the aforementioned lap shear test was employed and thus the quantitative results are not directly comparable to those in Table 3.)

These results show that formulations comprising epoxy methacrylate resin and non-fibrous carbon particles but no carbon fibres can provide suitable strength, conductivity and other properties for purposes of bonding anode and cathode flow field plates together for use in fuel cells.

It is convenient in manufacturing and in sample preparation of these formulations to work in parts per hundred as was done above. For comparison and other purposes however, it is convenient to describe the formulations in terms of component percentages. For illustrative purposes, Table 6 shows the component percentages by weight of a suitable exemplary formulation of the invention, i.e. sample #33.

TABLE 6

Adhesive formulation in % of exemplary sample #33

| Component | % by weight |
|---|---|
| Epoxy methacrylate resin | 50.5 |
| Styrene | 10.1 |
| Isobornylacrylate | 10.1 |
| Trimethylolpropane trimethacrylate | 5.1 |
| Asbury 4014 synthetic graphite | 18.9 |
| Amorphous silica | 0.76 |

TABLE 6-continued

Adhesive formulation in % of exemplary sample #33

| Component | % by weight |
|---|---|
| Tenax (~½ of which is dibenzoyl peroxide) | 4.5 (2.3 dibenzoyl peroxide) |
| Stabilizer | 0.02 |

Substantial testing was also performed on metal bipolar plates using adhesives with formulations similar to those of the epoxy methacrylate formulations in Table 1. Stainless steel plates with various corrosion resistant coatings were evaluated. Excellent beginning of life adhesion was achieved. Careful removal of the native oxide layer was required for low resistance values. Primers were also evaluated to increase adhesion and durability.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. An electrically conductive adhesive for bonding an anode flow field plate and a cathode flow field plate together to form a bipolar plate assembly for a fuel cell, the adhesive comprising:
   epoxy methacrylate resin in an amount ranging from about 3 to 70% by weight;
   styrene in an amount ranging from about 0 to 20% by weight;
   isobornylacrylate in an amount ranging from about 0 to 20% by weight;
   non-fibrous carbon particles in an amount ranging from about 11 to 30% by weight;
   a non-conductive rheology modifier;
   a radical initiator;
   a stabilizer; and
   carbon fibres in an amount ranging from 0 to less than 2% by weight.

2. The adhesive of claim 1 wherein the adhesive is essentially free of carbon fibres.

3. The adhesive of claim 1 wherein the amounts of the epoxy methacrylate resin, styrene, and isobornylacrylate are about 50%, 10% and 10% respectively.

4. The adhesive of claim 1 wherein the adhesive additionally comprises trimethylolpropane trimethacrylate in an amount about 5% by weight.

5. The adhesive of claim 1 wherein the carbon particles are synthetic graphite in an amount about 22% by weight.

6. The adhesive of claim 1 wherein the average particle size of the carbon particles is in the range from about 5 to 15 micrometers.

7. The adhesive of claim 1 wherein the rheology modifier is in an amount from about 0.01 to 2% by weight.

8. The adhesive of claim 7 wherein the rheology modifier is amorphous silica in an amount about 0.8% by weight.

9. The adhesive of claim 1 wherein the radical initiator is in an amount from about 0.5 to 6% by weight.

10. The adhesive of claim 1 wherein the stabilizer is tert-butylhydroquinone in an amount up to about 1% by weight.

11. The adhesive of claim 1 wherein the Tg of the adhesive is greater than about 100° C.

12. A bipolar plate assembly for a fuel cell comprising an anode flow field plate and a cathode flow field plate bonded together with the adhesive of claim 1.

13. The bipolar plate assembly of claim 12 wherein at least one of the flow field plates is made of flexible graphite, carbon, or metal.

14. The bipolar plate assembly of claim 13 wherein both the anode and cathode flow field plates are made of flexible graphite, carbon, or metal.

15. The bipolar plate assembly of claim 12 wherein the tensile strength of the bond is greater than about 40 MPa stress at break for a 0.5 square inch sample.

16. A fuel cell comprising the bipolar plate assembly of claim 12.

17. The fuel cell of claim 16 wherein the fuel cell is a solid polymer electrolyte fuel cell.

18. A method for bonding an anode flow field plate and a cathode flow field plate together to form a bipolar plate assembly for a fuel cell comprising:
    providing the anode flow field plate and the cathode flow field plate wherein the anode flow field plate comprises an anode flow field on one side, a coolant flow field on the other side, and a sealing surface on the coolant flow field side, and wherein the cathode flow field plate comprises a cathode flow field on one side, a coolant flow field on the other side, and a sealing surface on the coolant flow field side;
    applying an amount of the adhesive of claim 1 to at least one of the flow field plates such that adhesive covers the sealing surfaces between the plates;
    mating the coolant flow field sides of the anode and cathode flow field plates together in alignment; and
    curing the adhesive, thereby bonding the anode and cathode flow field plates to make the bipolar plate assembly.

19. The method of claim 18 wherein an adhesive filled gap in the range from about 3 to 20 micrometers thick remains between the sealing surfaces of the plates after the bonding.

20. The method of claim 19 wherein an adhesive filled gap in the range from about 4 to 7 micrometers thick remains between the sealing surfaces of the plates after the bonding.

21. The method of claim 18 wherein the sealing surfaces of the anode and cathode flow field plates are essentially free of primer.

22. The method of claim 18 comprising applying the adhesive in a liquid carrier and drying the applied adhesive before mating the plates together.

23. The method of claim 22 wherein the liquid carrier is an organic solvent.

24. The method of claim 18 wherein the applying comprises roller coating.

\* \* \* \* \*